United States Patent
Lin et al.

(10) Patent No.: US 9,521,359 B2
(45) Date of Patent: Dec. 13, 2016

(54) MOBILE HIGH-DEFINITION LINK DATA CONVERTER AND MOBILE HIGH-DEFINITION LINK DATA CONVERTING METHOD

(71) Applicant: Realtek Semiconductor Corp., HsinChu (TW)

(72) Inventors: Wen-Chi Lin, Yun-Lin County (TW); Ching-Sheng Cheng, Nantou County (TW); Tseng-I Lin, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 14/024,606

(22) Filed: Sep. 11, 2013

(65) Prior Publication Data

US 2014/0078391 A1    Mar. 20, 2014

(30) Foreign Application Priority Data

Sep. 14, 2012    (TW) .............................. 101133692 A

(51) Int. Cl.
| | |
|---|---|
| G06F 3/00 | (2006.01) |
| G06F 13/00 | (2006.01) |
| G06F 13/12 | (2006.01) |
| H04N 5/06 | (2006.01) |
| H04L 9/00 | (2006.01) |
| H04J 1/00 | (2006.01) |
| H04W 4/00 | (2009.01) |
| H04N 7/01 | (2006.01) |
| H04N 21/4363 | (2011.01) |
| G09G 5/00 | (2006.01) |

(52) U.S. Cl.
CPC ............ *H04N 7/0125* (2013.01); *G09G 5/006* (2013.01); *H04N 21/43632* (2013.01); *H04N 21/43635* (2013.01); *G09G 2340/02* (2013.01); *G09G 2370/10* (2013.01); *G09G 2370/12* (2013.01)

(58) Field of Classification Search
CPC ....... H04N 7/0125; H04N 7/01; G06F 13/385; G06F 13/4009; G06F 13/4013; G06F 13/4018
USPC ...... 710/65, 3, 20, 30, 33; 348/44, 521, 723, 348/725; 380/42; 370/329–330, 463, 281, 370/338; 375/132
See application file for complete search history.

(56) References Cited

U.S. PATENT DOCUMENTS

| | | | |
|---|---|---|---|
| 5,400,331 A * | 3/1995 | Lucak et al. ................... | 370/401 |
| 5,689,502 A * | 11/1997 | Scott ............................ | 370/281 |
| 5,774,787 A * | 6/1998 | Leopold et al. ............. | 455/12.1 |
| 2001/0009548 A1 | 7/2001 | Morris | |

(Continued)

FOREIGN PATENT DOCUMENTS

CN    102377970 A    3/2012

*Primary Examiner* — Farley Abad
*Assistant Examiner* — Henry Yu
(74) *Attorney, Agent, or Firm* — Winston Hsu; Scott Margo

(57) ABSTRACT

An exemplary Mobile High-Definition Link (MHL) data converter includes: a data decoding circuit, arranged for decoding an input data according to an MHL specification, and outputting a decoded data; and a data parsing circuit, coupled to the data decoding circuit, arranged for parsing out a plurality of output data from the decoded data. An MHL data converting method includes: decoding an input data according to an MHL specification, and outputting a decoded data; and parsing out a plurality of output data from the decoded data.

4 Claims, 5 Drawing Sheets

| 24BPP mode | Control period | Control period | Control period | d_out_ch0 | d_out_ch1 | d_out_ch2 |
|---|---|---|---|---|---|---|

| Packed-pixel mode | Control period | Control period | d_out_ch0 | d_out_ch1 |
|---|---|---|---|---|

(56) References Cited

U.S. PATENT DOCUMENTS

| | | | | |
|---|---|---|---|---|
| 2006/0018268 A1* | 1/2006 | Kakani | ............ | H04W 28/06 |
| | | | | 370/278 |
| 2006/0104333 A1* | 5/2006 | Rainbolt | ............ | H04B 1/713 |
| | | | | 375/132 |
| 2008/0002645 A1* | 1/2008 | Seki et al. | ............ | 370/338 |
| 2008/0267126 A1* | 10/2008 | Vujcic | ............ | H04B 7/2637 |
| | | | | 370/330 |
| 2009/0271530 A1* | 10/2009 | Ohkita | ............ | 710/3 |
| 2010/0220669 A1* | 9/2010 | Jeon et al. | ............ | 370/329 |
| 2010/0223370 A1* | 9/2010 | Kase et al. | ............ | 709/223 |
| 2010/0283894 A1* | 11/2010 | Horan et al. | ............ | 348/441 |
| 2011/0170011 A1* | 7/2011 | Choi et al. | ............ | 348/725 |
| 2011/0285916 A1* | 11/2011 | Takiduka | ............ | 348/723 |
| 2012/0020475 A1* | 1/2012 | Altmann | ............ | 380/42 |
| 2012/0134372 A1* | 5/2012 | Huang et al. | ............ | 370/463 |
| 2012/0182473 A1* | 7/2012 | Kim et al. | ............ | 348/521 |
| 2013/0009864 A1* | 1/2013 | Jeong | ............ | 345/156 |
| 2013/0042291 A1* | 2/2013 | Kambhatla | ............ | 725/127 |

* cited by examiner

24BPP mode: | Control period | Control period | d_out_ch0 | d_out_ch1 | d_out_ch2 |

Packed-pixel mode: | Control period | Control period | d_out_ch0 | d_out_ch1 |

FIG. 2

24BPP mode: | Ch1 data island leading | Ch2 data island leading | d_out_ch0 | d_out_ch1 | d_out_ch2 |

Packed-pixel mode: | Ch1 data island leading | d_out_ch0 | d_out_ch1 |

FIG. 3

| 24BPP mode | Ch0 video leading | Ch1 video leading | Ch2 video leading | d_out_ch0 | d_out_ch1 | d_out_ch2 |

| Packed-pixel mode | Ch0 data island trailing | Ch1 video leading | d_out_ch0 | d_out_ch1 |

FIG. 5

MOBILE HIGH-DEFINITION LINK DATA CONVERTER AND MOBILE HIGH-DEFINITION LINK DATA CONVERTING METHOD

BACKGROUND OF THE INVENTION

1. Field of the Invention

The disclosed embodiments of the present invention relate to data conversion, and more particularly, to a Mobile High-Definition Link (MHL) data converter and related data converting method.

2. Description of the Prior Art

The MHL specification is an innovative technique for mobile audio/video (AV) links, which allows mobile devices to output high definition 1080P films with 60 Hz frame rate to large-size monitors. One end of the MHL can perform data and AV link via the conventional micro USB 2.0 port, and the other end of the MHL can connect to a television (TV) or a monitor via a High Definition Multimedia Interface (HDMI).

When a conventional HDMI cable is used to receive MHL data, a dedicated MHL media access control (MAC) circuit is needed in addition to the HDMI MAC circuit. However, two sets of MAC circuits inevitably increase chip area and production cost. Thus, an innovative design can allow the existing receiver to receive the MHL data efficiently and economically.

SUMMARY OF THE INVENTION

Therefore, one of the objectives of the present invention is to provide a Mobile High-Definition Link (MHL) data converter and related data converting method.

According to a first aspect of the present invention, a Mobile High-Definition Link (MHL) data converter is disclosed. The MHL data converter includes a data decoding circuit and a data parsing circuit. The data decoding circuit is arranged to decode an input data according to an MHL specification, and outputting a decoded data. The data parsing circuit is coupled to the data decoding circuit, arranged to parse out a plurality of output data from the decoded data.

According to a second aspect of the present invention, a Mobile High-Definition Link (MHL) data converting method is disclosed. The MHL data converting method includes: decoding an input data according to an MHL specification, and outputting a decoded data; and parsing out a plurality of output data from the decoded data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating the data decoding circuit in FIG. 1 that uses a control period to identify the data boundary.

FIG. 3 is a diagram illustrating the data decoding circuit in FIG. 1 that uses a guard band to identify the data boundary according to an embodiment of the present invention.

FIG. 5 is a diagram illustrating the data decoding circuit in FIG. 1 that uses a guard band to identify the data boundary according to yet another embodiment of the present invention.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
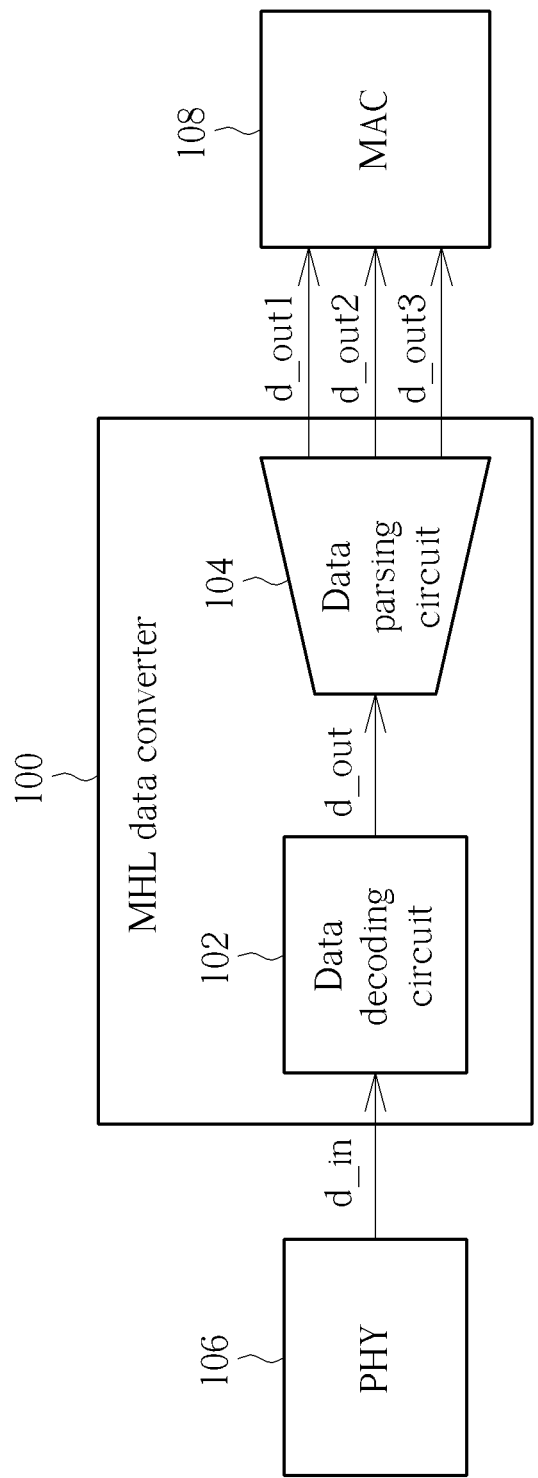
FIG. 1 is a diagram illustrating an embodiment of an MHL data converter according to the present invention.

Please refer to FIG. 1, which is a diagram illustrating an embodiment of an MHL data converter according to the present invention. In this embodiment, the MHL data converter 100 includes a data decoding circuit 102 and a data parsing circuit 104. The data decoding circuit 102 is arranged to decode an input data d_in generated from a physical (PHY) layer 106 according to an MHL specification, and accordingly output a decoded data d_out. The data parsing circuit 104 is coupled to the data decoding circuit 102, and arranged to parse out a decoded data d_out of one channel outputted from the decoding circuit 102 according to an HDMI specification to thereby obtain the output data of a plurality of channels. For instance, output data d_out1, d_out2, and d_out3 of three channels correspond to three primary colors R, G, and B respectively. However, this is not meant to be a limitation of the present invention. In addition, the data parsing circuit 104 further transmits output data d_out1, d_out2, and d_out3 to a Media Access Control (MAC) circuit 108, which complies with an HDMI specification. The MHL data converter 100 converts the MHL data (i.e., video, audio and control signals) into the HDMI data, and thus allows the HDMI data to be directly processed by the MAC circuit 108.

Regarding the data decoding circuit 102, it compares at least one known data pattern defined by the MHL specification with the input data d_in to find out data boundaries, and decodes the input data d_in according to the identified data boundaries to output the decoded data d_out. Please refer to FIG. 2, which is a diagram illustrating the data decoding circuit 102 of the MHL data converter of the present invention that uses a control period. In the 24 bit per pixel (BPP) mode, if the data decoding circuit 102 receives a data pattern of three consecutive control periods, then the following received data is data of one of the three channels by turns periodically, that is, d_out_ch0, d_out_ch1, d_out_ch2, d_out_ch0, d_out_ch1, d_out_ch2, and so on. On the other hand, in the packed-pixel mode, if the data decoding circuit 102 receives a data pattern of two consecutive control periods, then the following received data is d_out_ch0, d_out_ch1, d_out_ch0, d_out_ch1, and so on.

Figure 4:
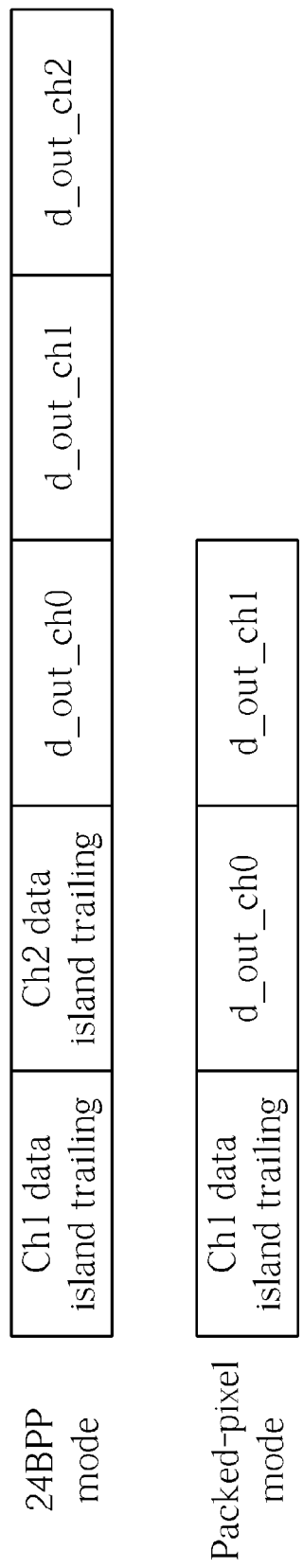
FIG. 4 is diagram illustrating the data decoding circuit in FIG. 1 that uses a guard band to identify the data boundary according to another embodiment of the present invention.

FIG. 3, FIG. 4 and FIG. 5 are diagrams illustrating the data decoding circuit 102 of the MHL data converter of the present invention that uses a guard band. As shown in FIG. 3, in the 24 BPP mode, if the data decoding circuit 102 receives a data pattern composed of a Ch1 data island leading and a Ch2 data island leading, then the following received data is d_out_ch0, d_out_ch1, d_out_ch2, d_out_ch0, d_out_ch1, d_out_ch2, and soon. On the other hand, in the packed-pixel mode, if the data decoding circuit 102 receives a data pattern of a single Ch1 data island heading, the following received data is d_out_ch0, d_out_ch1, d_out_ch0, d_out_ch1, and so on. As shown in FIG. 4, in the 24 BPP mode, if the data decoding circuit 102 receives a data pattern composed of a Ch1 data island trailing and a Ch2 data island trailing, it means the end of the received data. On the other hand, in the packed-pixel mode, if the data decoding circuit 102 receives a data pattern of a single Ch1 data island trailing, it means the end of the received data. As shown in FIG. 5, in the 24 BPP mode, if the data decoding circuit 102 receives a data pattern composed of a Ch1 video leading and a Ch2 video leading, then the following received data is d_out_ch0, d_out_ch1, d_out_ch2, d_out_ch0, d_out_ch1, d_out_ch2, and soon. On the other hand, in the packed-pixel mode, if the data decoding circuit 102 receives a data pattern composed of a Ch1 data island heading and a Ch1 video heading, then the following received data is d_out_ch0, d_out_ch1, d_out_ch0, d_out_ch1, and so on.

After the data decoding circuit 102 successfully finds out the data boundaries based on control period (s) and/or guard band (s), the decoded data d_out is outputted to the data parsing circuit 104, and then the data parsing circuit 104 converts the serially transmitted decoded data d_out into the parallel output data d_out1, d_out2, and d_out3, and transmit the parallel output data d_out1, d_out2, and d_out3 to the MAC circuit 108 (the BPP mode). Alternatively, the data parsing circuit 104 converts the serially transmitted decoded data d_out into the parallel output data d_out1 and d_out2, and transmit the parallel output data d_out1 and d_out2 to the MAC circuit 108 (the packed-pixel mode).

By using the MHL data converter and the MHL data converting method proposed by the present invention, the HDMI receiver is allowed to comply with the MHL specification without adding too much hardware cost, thus achieving the objective of reducing cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Mobile High-Definition Link (MHL) data converter, comprising:
    a data decoding circuit, arranged to decode an input data according to an MHL specification and output a decoded data; and
    a data parsing circuit, coupled to the data decoding circuit, the data parsing circuit arranged to parse out a plurality of output data from the decoded data;
    wherein the data parsing circuit transmits the plurality of output data to a Media Access Control (MAC) circuit which complies with a High Definition Multimedia Interface (HDMI) specification; and the data decoding circuit compares control period data and/or guard band data in at least one known data pattern defined by the MHL specification with the input data to find out data boundaries, and decodes the input data according to the data boundaries to output the decoded data and each of the at least one known data pattern is a data pattern of a plurality of consecutive control periods, and following received data is data of one of a plurality channels by turns periodically.

2. The MHL data converter of claim 1, wherein the data parsing circuit parses out the plurality of output data from the decoded data according to a High Definition Multimedia Interface (HDMI) format.

3. A Mobile High-Definition Link (MHL) data converting method, comprising:
    comparing control period data and/or guard band data in at least one known data pattern defined by an MHL specification with the input data to find out data boundaries;
    decoding the input data according to the data boundaries to output the decoded data;
    parsing out a plurality of output data from the decoded data; and
    transmitting the plurality of output data to a Media Access Control (MAC) circuit which complies with a High Definition Multimedia Interface (HDMI) specification;
    wherein each of the at least one known data pattern is a data pattern of a plurality of consecutive control periods, and following received data is data of one of a plurality channels by turns periodically.

4. The MHL data converting method of claim 3, wherein the step of parsing out the plurality of output data from the decoded data comprises:
    parsing out the plurality of output data from the decoded data according to a High Definition Multimedia Interface (HDMI) format.

* * * * *